(12) United States Patent
Goodall et al.

(10) Patent No.: US 6,265,506 B1
(45) Date of Patent: Jul. 24, 2001

(54) METHOD FOR THE PREPARATION OF COPOLYMERS OF ETHYLENE/NORBORNENE-TYPE MONOMERS WITH CATIONIC PALLADIUM CATALYSTS

(75) Inventors: Brian Leslie Goodall, Akron; Lester Howard McIntosh, III, Cuyahoga Falls, both of OH (US)

(73) Assignee: The B. F. Goodrich Company, Brecksville, OH (US)

( * ) Notice: Subject to any disclaimer, the term of this patent is extended or adjusted under 35 U.S.C. 154(b) by 0 days.

(21) Appl. No.: 09/094,349

(22) Filed: Jun. 9, 1998

Related U.S. Application Data

(63) Continuation-in-part of application No. 08/876,538, filed on Jun. 9, 1997, now abandoned.

(51) Int. Cl.[7] .............................. C08F 4/80; C08F 4/602; C08F 232/08
(52) U.S. Cl. .................. 526/172; 526/139; 526/141; 526/145; 526/147; 526/161; 526/171; 526/281; 502/155
(58) Field of Search .......................... 526/145, 147, 526/171, 172, 281, 139, 141, 161; 502/117, 155, 213

(56) References Cited

U.S. PATENT DOCUMENTS

| | | |
|---|---|---|
| 3,277,036 | 10/1966 | Whitworth, Jr. et al. . |
| 3,320,222 | 5/1967 | Cohen . |
| 3,494,897 | 2/1970 | Reding et al. . |
| 4,599,391 | 7/1986 | Yamamoto et al. . |
| 5,837,787 | 11/1998 | Harrington . |
| 5,852,145 * | 12/1998 | McLain et al. ............ 526/133 |
| 6,031,057 * | 2/2000 | Lippert et al. ............ 526/171 |

FOREIGN PATENT DOCUMENTS

| | | |
|---|---|---|
| 2123298 | 11/1997 | (DE) . |
| 0203799 | 12/1986 | (EP) . |
| 0429 105 A1 | 5/1991 | (EP) . |
| 504418A1 | 8/1996 | (EP) . |
| 816 387A1 | 1/1998 | (EP) . |
| WO 96/23010 | 8/1996 | (WO) . |
| 96/37526 | 11/1996 | (WO) . |
| WO96/37522 * | 11/1996 | (WO) . |

OTHER PUBLICATIONS

Research Disclosure No. 34210, Oct., 1992, pp. 743–744.*

* cited by examiner

Primary Examiner—David W. Wu
Assistant Examiner—R. Rabago
(74) Attorney, Agent, or Firm—Thoburn T. Dunlap; Nestor W. Shust

(57) ABSTRACT

A method of preparing generally amorphous copolymers of ethylene and at least one norbornene (NB)-type comonomer. These polymers may be random or alternating, depending on the choice of catalyst and/or the relative ratio of the monomers used. This method comprises polymerizing said monomers in a diluent or in bulk in the presence of a cationic palladium catalyst resulting from reacting a chelating ligand with a palladium (II) compound. The catalysts employed in this invention may be represented by the formula:

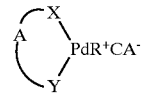

wherein

X and Y each independently is a donor heteroatom selected from P, N, O, S and As or an organic group containing said heteroatoms, and the heteroatoms are bonded to the bridging group A;

A is a divalent group selected from an organic group and phosphorus forming together with X, Y and Pd a 4, 5, 6, or 7-membered ring, and preferably a 5-membered ring;

R is a hydrocarbyl group; and

CA is a weakly coordinating anion.

15 Claims, No Drawings

METHOD FOR THE PREPARATION OF COPOLYMERS OF ETHYLENE/NORBORNENE-TYPE MONOMERS WITH CATIONIC PALLADIUM CATALYSTS

This is a continuation-in-part of U.S. Ser. No. 08/876,538 filed on Jun. 9, 1997, now abandoned.

BACKGROUND OF THE INVENTION

This invention is directed to a method of copolymerizing ethylene with cycloolefin monomers, often referred to as norbornene-type, or NB-type. More specifically, the method employs cationic palladium catalysts and the polymers obtained by the method of this invention are amorphous addition copolymers which may be random or alternating in character. Said catalysts also yield novel polymers from functional NB-type monomers.

Addition copolymers of ethylene and norbornene-type monomers are well known and can be prepared using a variety of catalysts disclosed in the prior art. This general type of copolymers can be prepared using free radical catalysts disclosed in U.S. Pat. No. 3,494,897 (Reding et al.); titanium tetrachloride and diethylaluminum chloride as disclosed in East German Patents 109,224 and 222,317 (VEB Leuna); or a variety of vanadium compounds, usually in combination with organoaluminum compounds, as disclosed in European Patent Application No. 156464 (Kajiura et al.). The copolymers obtained with these catalysts are random copolymers. U.S. Pat. No. 4,948,856 issued to Minchak et al. (B. F. Goodrich) discloses preparing generally alternating copolymers by the use of vanadium catalysts which are soluble in the norbornene-type monomer and a co-catalyst which may be any alkyl aluminum halide or alkyloxy aluminum halide. European Patent Application No. 0 504 418 A1 (Matsumoto et al.) discloses copolymerization of said monomers in the presence of catalysts such as transition metal compounds, including nickel compounds, and a compound which forms an ionic complex with the transition metal compound or a catalyst comprising said two compounds and an organoaluminum compound. More recently, metallocene catalysts were used to prepare copolymers of cycloolefins and α-olefins as disclosed in EP 283,164 (1987) issued to Mitsui Petrochemicals and EP 407,870 (1989), EP 485,893 (1990) and EP 503,422 (1991) issued to Hoechst AG. Most recently PCT published application WO96/23010 discloses processes of polymerizing ethylene, aryl olefins and/or selected cyclic olefins which are catalysed by selected transition metal compounds, including nickel complexes of diimine, and sometimes also a cocatalyst. This disclosure provides, however, that when norbornene or a substituted norbornene is used, no other olefin can be present.

SUMMARY OF THE INVENTION

It is a general object of the invention to provide a novel method of preparing generally amorphous copolymers of ethylene and at least one norbornene (NB)-type comonomer. These polymers may be random or alternating, depending on the choice of catalyst and/or the relative ratio of the monomers used. This method comprises polymerizing said monomers in a diluent or in bulk in the presence of a cationic palladium catalyst resulting from reacting a chelating ligand with a palladium (II) compound. If a weak chelating ligand is used, it is necessary to carry out the polymerization in the presence of excess chelate ligand.

Another object is to obtain novel copolymers of ethylene and at least one functional norbornene-type monomer.

DETAILED DISCLOSURE OF THE INVENTION

This invention is directed to a new method of preparing substantially amorphous copolymers of ethylene and one or more norbornene (NB)-type comonomers using cationic palladium catalysts. The resulting copolymers may be alternating or random, depending on the relative proportion of each type of monomer used and on the choice of the catalyst. This method comprises polymerizing said monomers in the presence of a cationic palladium catalyst in a diluent or in bulk.

The catalysts employed in the method of this invention are cationic palladium catalysts which are obtained from (i) a palladium compound, (ii) a neutral chelating ligand containing two heteroatoms, other than 2,2-bipyridine, (iii) a compound able to form an ionic complex when reacted with a palladium compound, and (iv) optionally, an organometallic cocatalyst, provided that when the palladium catalyst is devoid of the palladium-carbon sigma ($\sigma$) bond the cocatalyst must be employed.

The palladium compound may be any palladium (II) salt which contains anionic ligands selected from halides such as chloride, bromide, iodide, or fluoride ions; pseudohalides such as cyanide, cyanate, hydride, alkoxide, aryloxide and the like; carbanions such as branched and unbranched ($C_1$–$C_{40}$) alkylanions, phenyl anion; cyclopentadienylide anions; π-allyl groupings; enolates of β-dicarbonyl compounds such as acetylacetonate, 2,4-pentadionate; halogenated acetylacetonates such as 1,1,1,5,5,5-hexafluoro-2,4-pentanedionate, 1,1,1-trifluoro-2,4-pentanedionate; anions of acidic oxides of carbon such as carboxylates and halogenated carboxylates (e.g., 2-ethylhexanoate, neodecanoate trifluoroacetate, etc.) and oxides of nitrogen (e.g., nitrated, nitrites, etc.), of bismuth (e.g., bismuthate, etc.), of aluminum (e.g., aluminates etc.), of silicon (e.g., silicates etc.), of phosphorus (e.g., phosphates, phosphites, phosphines, etc.) and of sulfur (e.g., sulfates such as triflate, p-toluene sulfonate, sulfites, etc.); ylides; amides; imides; oxides; phosphides; sulfides; ($C_6$–$C_{24}$) aryloxides; ($C_1$–$C_{20}$) alkoxides; hydroxides; hydroxy ($C_1$–$C_{20}$) alkyl; catechols; oxylate; chelating alkoxides and aryloxides; complex anions such as $PF_6^-$, $AlF_3O_3SCF_3^-$, $SbF_6^-$ and compounds represented by the formulae $Al(R^7)_4^-$ and $B(X)_4^-$ wherein $R^7$ and X independently represent a halogen atom selected from Cl, F, I and Br, or a substituted or unsubstituted hydrocarbyl group. Representative of hydrocarbyl groups are ($C_1$–$C_{25}$) alkyl such as methyl, ethyl, propyl, butyl, octyl dodecyl, hexadecyl, eicosyl, docosyl, pentacosyl, and isomeric forms thereof; ($C_2$–$C_{25}$) alkenyl such as vinyl, allyl, crotyl, butenyl, hexenyl, decenyl, hexadecenyl, pentacosenyl, and isomeric forms thereof; ($C_6$–$C_{25}$) aryl such as phenyl, tolyl, xylyl, naphthyl, and the like; ($C_7$–$C_{25}$) aralkyl such as benzyl, phenethyl, phenbutyl, phenoctyl and the like; ($C_3$–$C_8$) cycloalkyl such as cyclopropyl, cyclobutyl, cyclohexyl, cyclooctyl, 2-norbornyl, 2-norbornenyl and the like. In addition to the above definitions X represents the radical:

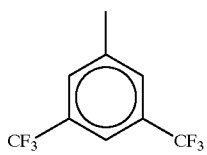

The term substituted hydrocarbyl means the hydrocarbyl group as previously defined wherein one or more hydrogen atoms have been replaced with a halogen atom such as Cl, F, Br and I (e.g., as in the perfluorophenyl radical); hydroxyl; amino; alkyl; nitro; mercapto and the like.

Illustrative examples of specific palladium compounds include palladium halides such as palladium iodide, palladium bromide and preferably palladium chloride; palladium acetylacetonates such as palladium bis(acetylacetonate); palladium carboxylates where the carboxylate group has up to 24 carbons and preferably from 2 to 12 carbons and may be exemplified by palladium acetate, hexanoate, ethylhexanoate, dodecanoate and the like. The palladium compound may also be a complex adduct of palladium salts bearing neutral donor ligands. It is preferred to use a relatively labile donor ligand such as bis(benzonitrile) palladium dichloride, (cyclooctadiene)palladium dichloride, (cyclooctadiene)palladium(methyl)bromide, (dimethoxyethane)palladium dibromide and the like.

Palladium adducts bearing strong chelating ligands may also be used, but such ligands are not preferred because these ligands may compete with the added chelate ligand (X~Y) to give mixed catalysts (in which there are palladium species present in solution containing either one ligand or the other, depending on the relative strength of the two ligands and the equilibrium conditions) which would yield mixed results, that is, a mixture that contains copolymers of different compositions and molecular weights. However by using an excess of the neutral chelate ligand (X~Y) the replacement of the stronger ligands of the palladium complex adducts will be favored, resulting in a catalyst which will polymerize both types of monomers to yield a copolymer of ethylene and an NB-type comonomer with uniform characteristics.

The neutral chelating ligands (X~Y) that may be used to prepare the catalysts employed in this invention are compounds such as diphosphines, diimines, diamines and other bidentate ligands in which or a variety of hemi-labile ligands in which the two hetero donor atoms both differ from one another (e.g. forming groupings such as P—O, P—S, P—N) and are the same (forming groupings such as P—P, N—N, O—O or S—S). The above examples are only illustrative and many other types of compounds could be used as the neutral chelating ligands. The exact chemical nature of such chelating ligands is not critical provided such ligand reacts with a palladium compound and attaches to palladium via the two heteroatoms, which may be the same or different, and is capable to form a 4 to 6-membered ring with palladium. In other words, the neutral chelating ligand contains two heteroatoms, which may be the same or different, which are connected by a bridge (A) which may be a straight chain or a cyclic hydrocarbyl, or a hydrocarbyl with a heteroatom, which is capable of forming a 4 to 6-membered ring, and preferably a 5-membered ring, with palladium. Specific examples of the chelating ligands are illustrated below:

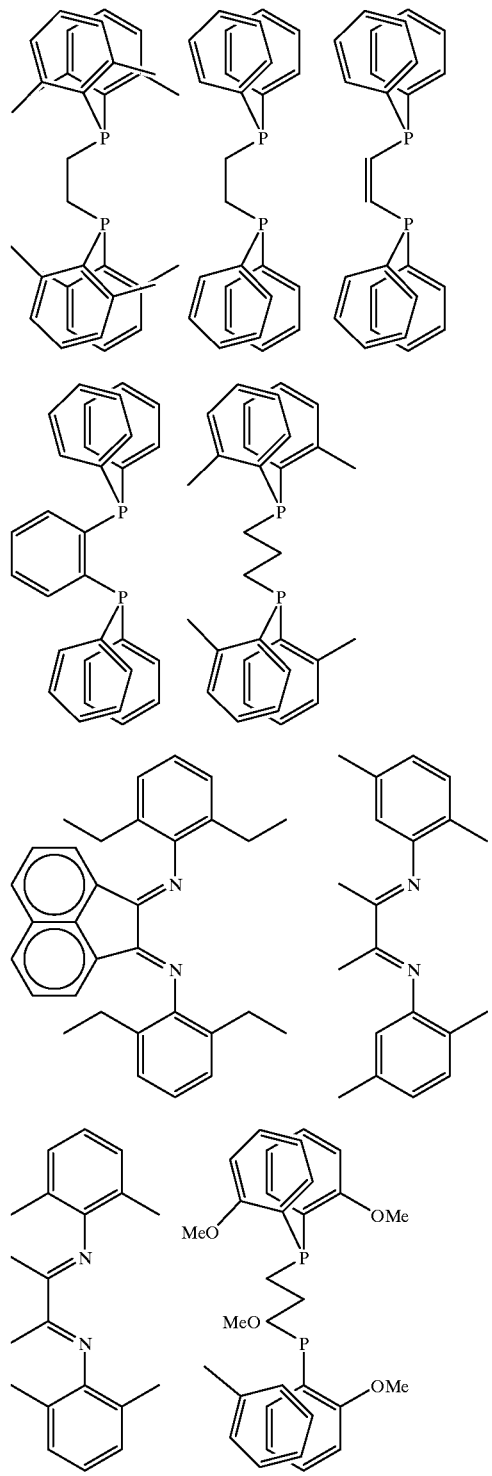

-continued

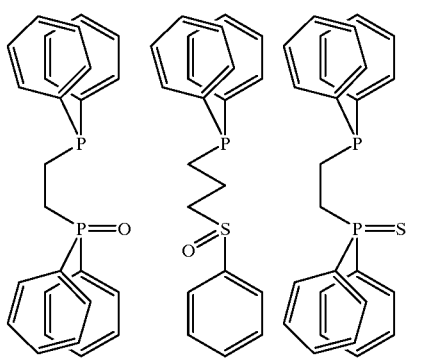
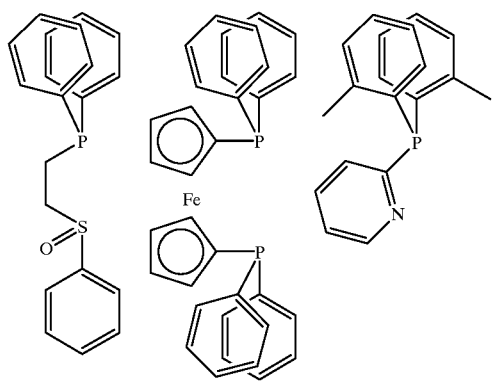
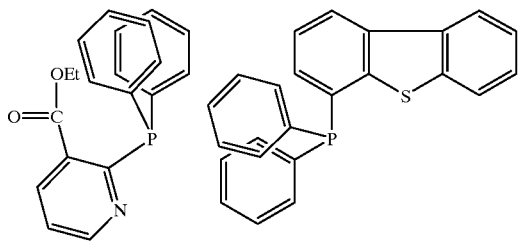
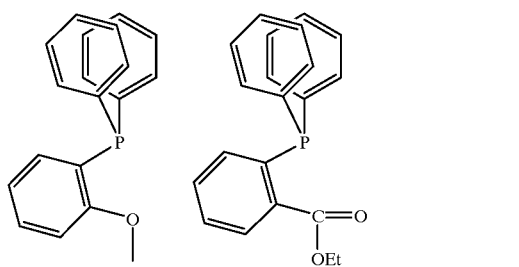
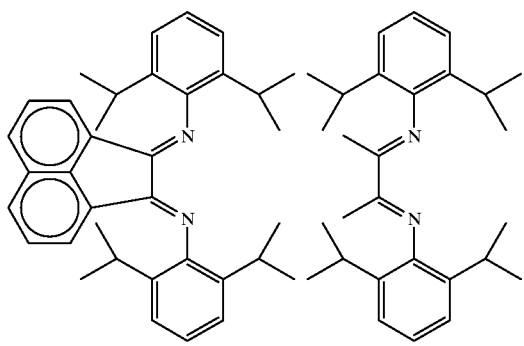

-continued

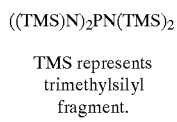
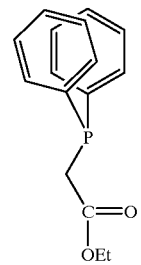

((TMS)N)₂PN(TMS)₂

TMS represents trimethylsilyl fragment.

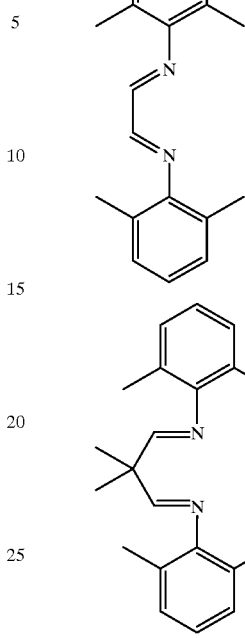
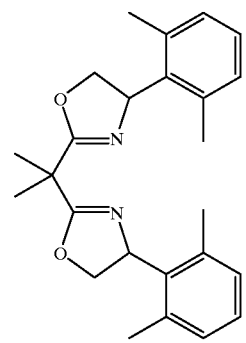

Compounds that are capable of forming an ionic complex when reacted with a palladium compound include the compounds comprising a cation and an anion wherein a plurality of functional groups are connected to an element, particularly a coordination complex compound, which may be represented by the following formulae (G) or (H):

$$([L^1-R^9]^{k+})_p([M^3Z^1Z^2\cdots Z^s]^{(s-r)-})_t \quad (G)$$

$$([L^2]^{k+})_p([M^4Z^1Z^2\cdots Z^s]^{(s-r)-})_t \quad (H)$$

wherein $L^2$ is $M^5$, $R^{10}R^{11}M^6$, $R^{12}_3C$ or $R^{13}M^6$.

In Formula (G) or (H), $L^1$ is a Lewis base; $M^3$ and $M^4$ are independently an element selected from the groups of VB, VIB, VIIB, VIII, IB, IIB, IIIA, IVA and VA of the Periodic Table; $M^5$ and $M^6$ are independently an element selected from the groups of IIIB, IVB, VB, VIB, VIIB, IA, IB, IIA, IIB and VIIA of the Periodic Table; $Z^1$ to $Z^s$ are independently a hydrogen atom, dialkylamino group, $C_{1-20}$ alkoxy group, $C_{6-20}$ aryloxy group, $C_{1-20}$ alkyl group, $C_{6-20}$ aryl group, alkylaryl group, arylalkyl group, $C_{1-20}$ halogenated hydrocarbon group, $C_{1-20}$ acyloxy group, organometalloid group or halogen atom; two or more of $Z^1$ to $Z^s$ may form a ring; $R^9$ is a hydrogen atom, $C_{1-20}$ alkyl group, $C_{6-20}$ aryl group or aryl alkyl group, $R^{10}$ and $R^{11}$ are independently a cyclopentadienyl group, substituted cyclopentadienyl group, indenyl group or fluorenyl group; $R^{12}$ is a $C_{1-20}$ alkyl group, aryl group, alkylaryl group or arylalkyl group; $R^{13}$ is a large ring ligand such as tetraphenylporphyrin and phthalocyanine; r is a valency of $M^3$ and $M^4$ and is an integer of 1 to 7; s is an integer of 2 to 8; k is an ion value number of $[L^1-R^9]$ and $[L^2]$, and is an integer of 1 to 7; and p is an integer of at least 1; and t is specified by the formula: $t=(p \times k)/(s-r)$.

Examples of the above Lewis bases are amines such as ammonium, methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline; phosphines such as triethylphosphine, triphenylphosphine and diphenylphosphine; ethers such as dimethyl ether, diethyl ether, tetrahydrofuran and dioxane; thioethers such as diethyl thioethers and tetrahydrothiophene; and esters such as ethylbenzoate.

Examples of $M^3$ and $M^4$ are, for example, B, Al, Si, P, As and Sb. Examples of $M^5$ are Li, Na, Ag, Cu, Br, I and $I_3$. Examples of $M^6$ are Mn, Fe, Co, Ni and Zn. Examples of $Z^1$ to $Z^5$ include dialkylamino groups such as dimethylamino group and diethylamino group; $C_{1-20}$ alkoxy groups such as a methoxy group, ethoxy group and n-butoxy group; $C_{6-20}$ aryloxy groups such as phenoxy group, 2,6-dimethylphenoxy group and naphthyloxy group; $C_{1-20}$ alkyl groups such as a methyl group, ethyl group, n-propyl group, isopropyl group, n-butyl group, n-octyl group and 2-ethylhexyl group; $C_{6-20}$ aryl, alkylaryl or arylalkyl groups such as phenyl group, p-tolyl group, benzyl group, 4-t-butylphenyl group, 2,6-dimethylphenyl group, 3,5-dimethylphenyl group, 2,4-dimethylphenyl group, 2,3-dimethylphenyl group; $C_{1-20}$ halogenated hydrocarbon groups such as p-fluorophenyl group, 3,5-difluorophenyl group, pentachlorophenyl group, 3,4,5-trifluorophenyl group, pentafluorophenyl group, 3,5-di(trifluoromethyl) phenyl group; halogen atoms such as F, Cl, Br and I; organometalloid groups such as a pentamethylantimony group; trimethylsilyl group, trimethylgermyl group, diphenylarsine group, dicyclohexylantimony group and diphenylboron group. Examples of $R^9$ and $R^{12}$ are the same as above. Examples of substituted cyclopentadienyl groups represented by $R^{10}$ and $R^{11}$ include those substituted with an alkyl group such as a methylcyclopentadienyl group, butylcyclopentadienyl group and pentamethylcyclopentadienyl group. Usually, the alkyl groups have 1 to 6 carbon atoms and the number of substituted alkyl groups is an integer of 1 to 5. In Formula (G) or (H), $M^3$ and $M^4$ are preferably boron.

Of those compounds represented by Formula (G) or (H), the following compounds can be particularly used as preferred ones.

Compounds Represented by Formula (G):

Triethylammonium tetraphenylborate, tri(n-butyl) ammonium tetraphenylborate, trimethylammonium tetraphenylborate, tetraethylammonium tetraphenylborate, methyltri(n-butyl)ammonium tetraphenylborate, benzyltri (n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzyldimethylsulfonium tetraphenylborate, triethylammonium tetrakis(pentafluorophenyl)borate, tri(n-butyl) ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, methyltri(n-butyl)ammonium tetrakis(pentafluorophenyl) borate, benzyltri(n-butyl)ammonium tetrakis (pentafluorophenyl)borate, methyldiphenylammonium tetrakis(pentafluorophenyl)borate, methyltriphenylammonium tetrakis(pentafluorophenyl)borate, dimethyldiphenylammonium tetrakis(pentafluorophenyl)borate, anilinium tetrakis(pentafluorophenyl)borate, methylanilinium tetrakis (pentafluorophenyl)borate, dimethylanilinium tetrakis (pentafluorophenyl)borate, trimethylanilinium tetrakis (pentafluorophenyl)borate, dimethyl(m-nitroanilinium) tetrakis(pentafluorophenyl)borate, dimethyl(p-bromoanilinium) tetrakis(pentafluorophenyl)borate, pyridinium tetrakis(pentafluorophenyl)borate, p-cyanopyridinium tetrakis(pentafluorophenyl)borate, N-methylpyridinium tetrakis(pentafluorphenyl)borate, N-benzylpyridinium tetrakis(pentafluorophenyl)borate, O-cyano-N-methylpyridinium tetrakis(pentafluorophenyl) borate, p-cyano-N-methylpyridinium tetrakis (pentafluorophenyl)borate, p-cyano-N-benzylpyridinium tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, dimethylanilinium tetrakis(3,5-ditrifluoromethylphenyl)borate, and hexafluoroarsenic acid triethylammonium.

Compounds Represented by Formula (H):

Ferrocenium tertraphenylborate, silver tetraphenyl borate, trityl tetraphenylborate, tetraphenylporphyrin manganese tetraphenylborate, ferrocenium tetrakis(pentafluorophenyl) borate, 1,1'-dimethylferrocenium tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tertrakis (pentafluorophenyl)borate, silver tetrakis (pentafluorophenyl)borate, trityltetrakis(pentafluorophenyl) borate, lithium tetrakis(pentafluorophenyl)borate, sodium tetrakis(pentafluorophenyl)borate, tetraphenylporphyrin manganese tetra(pentafluorophenyl)borate, tetra (pentafluorophenyl)boric acid (tetraphenylporphyrin iron chloride), tetra(pentafluorophenyl)boric acid (tetraphenylporphyrin zinc), tetrafluorosilver borate, hexafluoroarsenical silver, and hexafluorosilver antimonate.

Further, compounds other than those represented by Formula (G) or (H) such as the strong Lewis acids tris (pentafluorophenyl)boron, tris(3,5-trifluoromethyl)phenyl) boron and triphenylboron and substituted derivatives thereof, methaluminoxane, alkylaluminum dihalides, alkylaluminum sesquihalides, can also be used.

The catalysts employed in this invention may be represented by the formula:

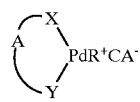

wherein
X and Y each independently is a donor heteroatom selected from P, N, O, S and As or an organic group containing said heteroatoms, and the heteroatoms are bonded to the bridging group A;

A is a divalent group selected from an organic group and phosphorus forming together with X, Y and Pd a 4, 5, 6, or 7-membered ring, and preferably a 5-membered ring;

R is a hydrocarbyl group; and $CA^{31}$ is a weakly coordinating anion.

The organic groups on the heteroatoms in X and Y may be alkyl of 1–12 carbons, such as methyl, ethyl, propyl, butyl, hexyl, octyl, decyl and dodecyl and isomeric forms thereof, aryl and alkyl substituted aryl of 6–25 carbons, such as phenyl, tolyl, xylyl, naphthyl and the like; aralkyl of 7 to 25 carbons, such as benzyl, phenethyl, phenpropyl, phenbutyl, phenhexyl, naphthoctyl and the like; silyl, including alkyl and alkoxysily having 1–12 carbons, such as trimethylsilyl, triethylsilyl, tributylsilyl, trihexylsilyl, trioctylsilyl, tridodecylsilyl, trimethoxysilyl, triethoxysilyl, methyldimethoxysilyl, dimethylmethoxysilyl and the like and the isomers thereof. Heteroatoms, such as O, S, N and others may be part of the saturated, unsaturated or aromatic groups.

Preferably X and Y contain the same heteroatoms and more preferably they are N or P containing straight or branched chain alkyl groups of 1–4 carbons, or aryl substituted alkyl groups containing 7–12 carbons, or aryl and alkyl substituted aryl groups containing 6–18 carbons. More preferably these heteroatoms contain substituted aryl groups and most preferably phenyl groups substituted in at least one ortho position with methyl, ethyl, propyl, isopropyl or phenyl.

The divalent organic groups which form the bridge A may be derived from saturated, unsaturated or aromatic groups, optionally containing one or more heteroatoms and optionally substituted with alkyl or aryl groups or A may be a divalent phosphorus (P). Alternatively A may be derived from alkyl or aryl substituted silyl group of the formula $R_2Si$ or $(RSi)_2$. Preferably A is an alkylene of 1–3 carbons, especially ethylene; or a group represented by the formula:

where T is hydrogen or an alkyl of 1–4 carbons or, both T groups together with the carbon atoms to which they are attached, form a cyclic or polycyclic structure; i is an integer of 1 or 2; and the symbol "≅" indicates that this could be either a single or a double bond. When ≅ is a single bond i is 2 and when ≅ is a double bond i is 1. The above formula would include such structures as:

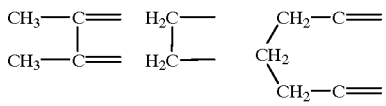

The specific nature of A is not critically important with regard to the ability of the catalyst to form the polymers of this invention. However, A has an influence on the composition of the resulting polymer in terms of the molecular weight of the polymer and the level of comonomer incorporation which determines the physical properties of the polymers, such as the glass transition temperature (Tg), tensile strength, elongation to break and the like. For example, under typical polymerization conditions catalyst III gives an ethylene/norbornene copolymer of a moderate molecular weight (e.g., 50,000–200,000 $M_w$), but catalyst VIII, under similar polymerization conditions, gives a high molecular weight copolymer (e.g., 400,000–1,000,000 $M_w$). The norbornene content in the copolymer is as follows: up to about 50 mole % with catalyst VIII and up to 80 mole % with catalyst III.

The term "hydrocarbyl", as used in defining R above, means hydrogen, an aliphatic, alicyclic, aromatic or mixed aliphatic-aromatic monovalent radical, optionally containing one or more "polar substituents" and/or one or more in-chain heteroatoms which are inert under polymerizing conditions. Thus such hydrocarbyl groups may be straight chain or branched alkyl substituents having 1 to 12 carbons and more practically 1 to 6 carbons; optionally they may contain one or more polar substituents such as —CN, —$CO_2R'$, —OR', —CON(R')$_2$, and the like. The hydrocarbyl groups may also be an aralkyl group such as benzyl, or a substituted or unsubstituted aryl group such as phenyl, tolyl, naphthyl and the like. The hydrocarbyl group may be optionally substituted with halogens, preferably fluorine or chlorine. Illustrative examples of the hydrocarbyl groups when it is a simple straight chain or branched alkyl group are methyl, ethyl, iso-propyl, neo-pentyl, tert-butyl and the like; aralkyl groups such as benzyl and phenylethyl and the like; and aryl groups such as phenyl, pentafluorophenyl, ortho-tolyl, para-tolyl, para-chlorophenyl, 3,5-bis(trifluoromethyl) phenyl and the like. R' represents a branched or straight chain alkyl group, an aralkyl group or a substituted aryl group as defined above.

The use of an organometallic cocatalyst in the method of this invention is optional, except when the palladium catalyst does not contain (is devoid of) a palladium-carbon sigma (σ) bond, such cocatalyst must be employed. This means that when a simple palladium salt, such as palladium dichloride or palladium acetate, or a complex such as bis(benzonitrile) pallladium dibromide, or a catalyst containing a strongly chelating bidentate ligand, such as catalyst I illustrated below, an organometallic cocatalyst must be employed since all of these palladium species are devoid of palladium-carbon sigma bond. The organometallic cocatalysts that may be used are well known in the art and include organolithium, organomagnesium, organozinc and organoaluminum compounds. Preferred are organoaluminum compounds such as methaluminoxane and alkylaluminum compounds (e.g., triethylaluminum, diethylaluminum chloride, ethylaluminum dichloride, ethylaluminum sesquichloride, and the like). If methaluminoxane is employed as the cocatalyst, the preferred ratio of Al to Pd is 50–2000:1. When an alkylaluminum is used as the cocatalyst, the typical ratio of Al:Pd is 1–50:1, preferably 3–20:1 and most preferably 5–10:1.

Representative examples of the catalysts are illustrated below:

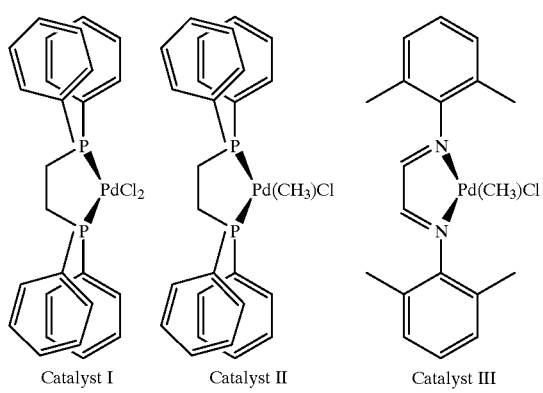

Catalyst I  Catalyst II  Catalyst III

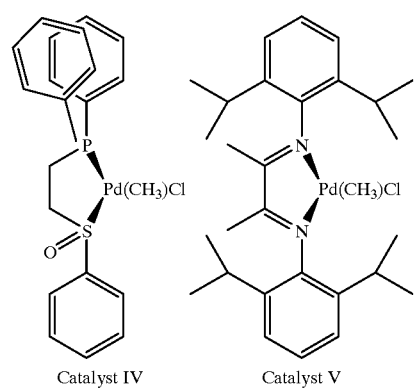

Catalyst IV  Catalyst V

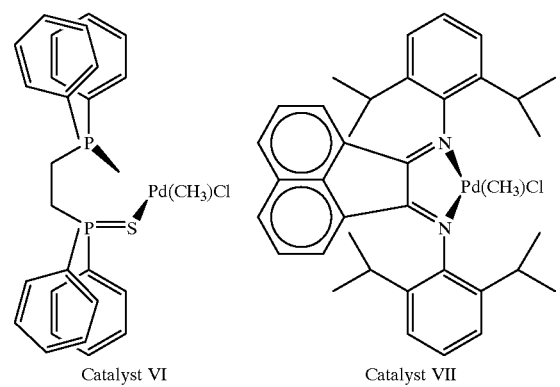

Catalyst VI  Catalyst VII

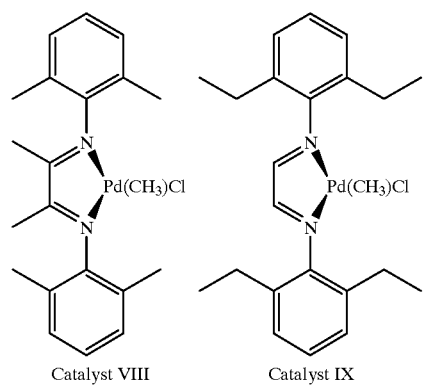

Catalyst VIII  Catalyst IX

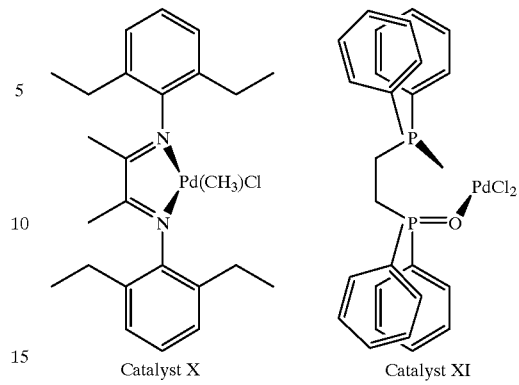

Catalyst X  Catalyst XI

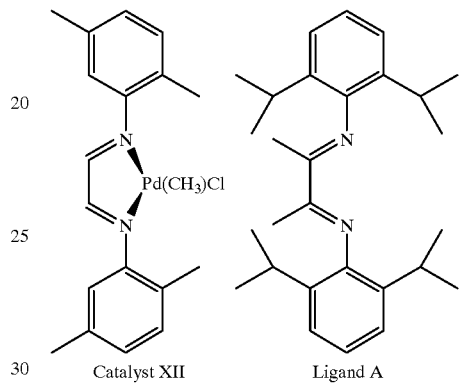

Catalyst XII  Ligand A

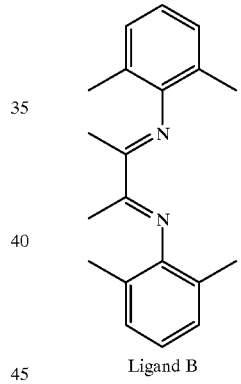

Ligand B

There are many routes to generate the catalysts employed in the method of this invention. Selected preferred routes are generically described below.

(a) The catalyst can be synthesized and isolated as a well-defined single component catalyst with the generic formula (X~Y)PdR$^+$CA$^-$ in which X~Y represents any of the chelating ligands more specifically described, CA— represents a weakly coordinating anion as described below and R represents a hydride or hydrocarbyl group.

(b) The catalyst may be generated in situ in the reactor, or by premixing prior to the polymerization step, by reacting (X~Y)PdRZ with M$^+$CA$^{31}$ , X~Y, CA—, Z and R are defined below. M$^+$ represents any cation capable of abstracting the halogen, pseudo halogen or other leaving group from the palladium; examples include sodium, lithium, thallium, silver, tetrabutylammonium, dimethylanilinium and the like.

(c) The catalyst may be generated in situ in the reactor, or by premixing prior to the polymerization step, by reacting $(X\sim Y)Pd(R)_2$ with $LH^+CA^-$, $X\sim Y$ and CA— are as defined below and L represents an optional Lewis base such as an ether or an amine which can be used to complex or stabilize the strong acid, $H^+CA^-$. Specific examples of $LH^+CA^-$ include $H^+SbF_6^-$, $H^+PF_6^-$ and $(Et_2O)_2H^+B(C_6H_3(m\text{-}CF_3)_2)_4^-$ and the like.

(d) The catalyst may be generated in situ in the reactor, or by premixing prior to the polymerization step, by reacting $(X\sim Y)PdR_xZ_y$ with an organometallic cocatalyst. Organometallic cocatalysts are those main group metal compounds containing metal-carbon σ-bonds. Examples include organozinc, organomagnesium and organotin compounds. Preferred cocatalysts are the organoaluminum compounds with most preferred cocatalysts including methaluminoxane, ethylaluminum dichloride, methylaluminum dichloride, ethylaluminum sesquichloride, diethylaluminum bromide, di-iso-butylaluminum chloride, triethylaluminum, tri-iso-butylaluminum, di-iso-butylaluminum hydride and the like. This procedure may optionally be carried out in the presence of a strong Lewis acid such as tris(pentafluoro)phenylboron, tris(bis-2,3(trifluoromethyl)phenyl)boron, boron trifluoride.etherate and the like. This procedure for generating the catalyst may also optionally be carried out in the presence of excess chelating ligand $(X\sim Y)$. Typically when this procedure is followed using a chelating diphosphine such as bis(diphenylphosphino)ethane (dppe), which is a strong chelate, no excess ligand is needed to ensure the production of clean copolymers of the norbornene-type monomers with ethylene. However with the other chelate ligands the use of excess chelate ligand is preferred if it is desired to generate clean copolymers. Failure to use excess ligand in these cases can result in the production of in-reactor blends of homopolymers of the norbornene-type monomer mixture used and copolymers of said norbornene-type monomers and ethylene. The composition of these blends can be steered by controlling the level and type of added excess ligand and/or process conditions (especially monomer concentrations and reaction diluent).

(e) The catalyst may be generated in situ in the reactor, or by premixing prior to the polymerization step, by reacting any palladium (II) salt with an organometallic cocatalyst (such as methaluminoxane, ethylaluminum dichloride ot ethylaluminum sesquichloride) in the presence of the chelating ligand $(X\sim Y)$ which may be present in a substantial excess (for example two times, ten times or even twenty times excess relative to the palladium salt). Optionally a strong Lewis acid such as tris(pentafluoro) phenylboron, tris(bis-2,3(trifluoromethyl)phenyl)boron, boron trifluoride.etherate and the like may also be used in combination with these catalyst systems. When a strong Lewis acid is used, any organometallic cocatalysts are those mentioned above. Typically when this procedure is followed using a chelating diphosphine such as bis (diphenylphosphino)ethane (dppe), which is a strong chelate, no excess ligand is needed to ensure the production of clean copolymers of the norbornene-type monomers with ethylene. However with the other chelate ligands the use of excess chelate ligand is preferred if it is desired to generate clean copolymers. Failure to use excess ligand in these cases can result in the production of in-reactor blends of homopolymers of the norbornene-type monomers used and copolymers of said norbornene-type monomers and ethylene. The composition of these blends can be steered by controlling the level and type of added excess ligand and/or process conditions (especially monomer concentrations and reaction diluent).

In addition to any of the above described routes to generate the catalysts employed in the present invention, any route which generates catalysts of the general type $(X\sim Y)PdR^+CA^{31}$ may also be used.

In the above general descriptions dealing with the preparation of the catalysts the grouping $X\sim Y$ represents any of the chelating ligands described above; $CA^{31}$ represents a weakly or non-coordinating anion. The key to proper anion design requires that it be labile and stable toward reactions with the cationic metal complex in the final catalyst species and that it renders the single component catalyst soluble in the hydrocarbon or halohydrocarbon solvents. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Examples of the anions meeting the above criteria are the following: $BF_4^-$, $PF_6^-$, $SbF_6^-$, $AsF_6^-$, $B(C_6F_5)_4^-$, $B(C_6F_5)_3(OR")^{31}$, $B(C_6F_4C_6F_5)_3(OR")^-$, $B(C_6F_5)_3(O_2CR")^-$, $B(C_6H_3(m\text{-}CF_3)_2)_4^-$, $Al(O(CF_3)_2C_6H_5)_4^-$, $Sb(OTeF_3)_6^-$— and the like. In these representative formulae, R" is a hydrocarbyl group such as an alkyl, aryl or aralkyl. Preferably an alkyl or branched alkyl, more preferably containing 8 or more C atoms, most preferably 16 or more C atoms in order to impart solubility of the resulting catalyst system in hydrocarbons such as toluene or cyclohexane. Optionally the hydrocarbyl group may be partially or fully substituted with fluorine or chlorine.

The cationic palladium catalyst is suitably employed as an unsupported material. In certain modifications, the palladium catalyst can be supported on an inorganic, catalyst carrier which is normally solid under reaction conditions and is heterogeneous, i.e., is substantially insoluble in the reaction medium. Illustrative examples of suitable inorganic, solid catalyst carriers are inorganic acidic oxides such as alumina and inorganic materials known as refractory oxides. Suitable refractory oxides include synthetic components as well as acid treated clays and similar materials such as kieselguhr or crystalline macroreticular aluminosilicates known in the art as molecular sieves. In general, synthetic catalyst carriers are preferred over natural occurring materials or molecular sieves. Exemplary synthetic catalyst carriers include alumina, silica-alumina, silica-magnesia, silica-alumina-titania, silica-alumina-zirconia, silica-titania-zirconia, silica-magnesia-alumina, and the like. Particularly preferred catalyst carriers are siliceous refractory oxides containing up to 90% by weight of alumina, especially silica and silica-alumina. In another modification the catalyst can be supported on a polymeric or cross-linked polymeric support.

When the catalyst composition is supported, the proportion of catalyst composition to carrier is not critical. In general, proportions of catalyst composition from 0.01% to 70% by weight, based on the catalyst carrier are satisfactory, with amounts of from 0.1% to 20% by weight, calculated on the same basis, being preferred. The catalyst composition is introduced onto the carrier in any suitable manner. In one modification, the supported catalyst composition is prepared by intimately contacting the preformed catalyst composition and the carrier in an inert diluent, preferably the same inert diluent employed for preparing the catalyst composition. In another modification, the catalyst composition can be prepared directly on the catalyst carrier support surface by contacting the catalyst composition precursors in the presence of the catalyst carrier in a suitable inert diluent. In another modification, the anion of the compound capable of forming an ionic complex (G or H) is bound to the support. In yet another modification, supported methalumoxane is used as a cocatalyst.

NB-Type Monomers

The second category of monomers are the NB-type monomers which are polycyclic and contain at least one norbornene-moiety and may be selected from those represented by the formula below:

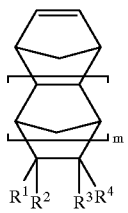

wherein $R^1$ to $R^4$ independently represents hydrogen, linear or branched ($C_1$ to $C_{10}$) alkyl, aromatic or saturated or unsaturated cyclic groups; a functional substituent selected from the group $-(CH_2)_n-C(O)OR$, $-(CH_2)_n-OR$, $-(CH_2)_n-OC(O)R$, $-(CH_2)_n-C(O)R$ and $-(CH_2)_n-OC(O)OR$, $-(CH_2)_nC(R)_2CH(R)(C(O)OR)$, $-(CH_2)_nC(R)_2CH(C(O)OR)_2$, wherein R represents hydrogen, or linear and branched ($C_1$ to $C_{10}$) alkyl; or a silyl substituent represented as follows:

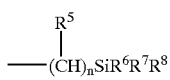

wherein $R^5$ independently represents hydrogen, methyl, or ethyl, $R^6$, $R^7$ and $R^8$ independently represent halogen selected from bromine, chlorine, fluorine, and iodine, linear or branched ($C_1$ to $C_{20}$) alkyl, linear or branched ($C_1$ to $C_{20}$) alkoxy, linear or branched ($C_1$ to $C_{20}$) alkyl carbonyloxy (e.g., acetoxy), linear or branched ($C_1$ to $C_{20}$) alkyl peroxy (e.g., t-butyl peroxy), substituted or unsubstituted ($C_6$ to $C_{20}$) aryloxy; any of $R^1$ and $R^2$ or $R^3$ and $R^4$ can be taken together to form a ($C_1$ to $C_{10}$) alkylidenyl group; m is an integer from 0 to 5; and n is an integer from 0 to 10, preferably n is 0. $R^1$ and $R^4$ taken together with the two ring carbon atoms to which they are attached represent a saturated cyclic group of 4 to 8 carbon atoms. The cyclic group formed by $R^1$ and $R^4$ can be substituted by at least one of $R^2$ and $R^3$, the definition of which is set forth above.

As discussed above, substituents $R^1$ and $R^4$ together with the two ring carbon atoms to which they are attached can form a saturated cyclic group of 4 to 8 carbon atoms. Generically such monomers are represented by the following structure:

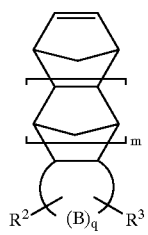

wherein B is a $-CH_2-$ group and q is a number from 2 to 6. It should be apparent that when the carbon atom in the $-CH_2-$ group represented by B is substituted by $R^2$ or $R^3$ (i.e., $R^2$ and $R^3$ are other than hydrogen), the $-CH_2-$ group will have one less hydrogen atom attached thereto.

Representative structures are shown below:

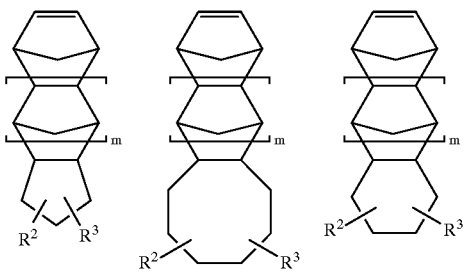

Polycyclic monomers of the above formula with a substituent selected from the group $-(CH_2)_nC(R)_2CH(R)(C(O)OR)$ or $-(CH_2)_nC(R)_2CH(C(O)OR)_2$ can be represented as follows:

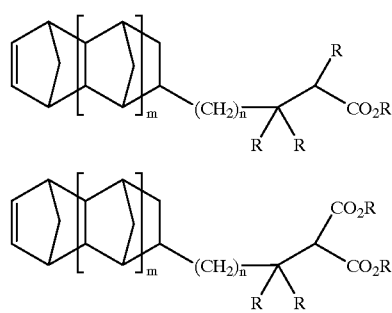

In the above formulae m is preferably 0 or 1, more preferably m is 0. When m is 0 the preferred structure is represented as follows:

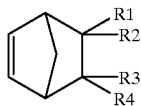

wherein $R^1$ to $R^4$ are previously defined.

Illustrative examples of suitable monomers include 2-norbornene, 5-methyl-2-norbornene, 5-hexyl-2-norbornene, 5-decyl-2-norbornene, 5-phenyl-2-norbornene, 5-naphthyl-2-norbornene 5-ethylidene-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (e.g., symmetrical and asymmetrical trimers), 5-hydroxy-2-norbornene, 5-hydroxymethyl-2-norbornene, 5-methoxy-2-norbornene, 5-t-butoxycarbonyl-2-norbornene, 5-methoxy-carbonyl-2-norbornene, 5-carboxy-2-norbornene, 5-carboxymethyl-2-norbornene, decanoic acid of 5-norbornene-2-methanol, octanoic acid ester of 5-norbornene-2-methanol, n-butyric acid ester of 5-norbornene-2-methanol, 5-triethoxysilyl-norbornene, 5-trichlorosilyl-norbornene, 5-trimethylsilyl norbornene, 5-chlorodimethylsilyl norbornene, 5-trimethoxysilyl norbornene, 5-methyldimethoxysilyl norbornene, and 5-dimethylmethoxy norbornene.

The copolymers of the present invention are substantially amorphous and may be alternating or random, depending on the choice of the catalyst and/or the ration or the relative concentration of the monomers used. The monomers may be used in an amount of from about 1 mol % to about 90 mole % of at least one NB-type monomer, preferably from about 4 to about 75 mol per cent and most preferably from about 40 to about 65 mol per cent of the NB-type monomer. The corresponding balance of the monomer, to make up 100 per cent, is ethylene. The amount of each comonomer may be selected depending on the desired properties of the resulting copolymer. For example, if a polymer having a higher glass transition temperature is desired, such as between 120° C. to over 200° C., is desired, it is necessary to incorporate a higher mol per cent amount of norbornene, such as between 40 and 60% or even up to 90%. Similarly, if a lower Tg polymer is desired, it is necessary to incorporate a lower mol per cent of norbornene, such as between 20 and 30 mol per cent to give Tg between 30 and 70° C. Different norbornene monomers give different behavior with regard to their effect on Tg. For example, alkylnorbornenes all give lower Tg's than does norbornene itself at a given level of incorporation, with longer alkyl chains giving successively lower Tg's. On the other hand polycyclic norbornene-type monomers give higher Tg's than does norbornene for a given level of incorporation. For example tetracyclododecene gives a Tg in the range of 120 to 160° C. at only 25 to 35 mol % incorporation (compared to 40 to 60 mol % in the case of norbornene). Furthermore, it is possible to control the glass transition temperature by using a mixture of different NB-type monomers. More specifically, by replacing some norbornene with a substituted norbornene, such as alkyl norbornene, a lower Tg polymer results as compared to the copolymer if only norbornene were used. On the other hand, replacing some of the NB with phenylNB, a higher Tg polymer results.

Copolymers prepared from ethylene and a functional NB-type monomer yield novel copolymers which have unique properties. Such copolymers include polymers of ethylene and one or more functional NB-type monomer(s) as well as polymers of ethylene, one or more functional NB-type monomer(s) and one or more non-functional NB-type monomers. These novel polymers contain repeating units which may be represented by the structures —(—$C_2H_4$—)$_a$— and

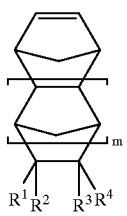

where the various R groups and m are as defined above and a is an integer of 1 to 50, 100, 1,000, or up to 5,000; and more often a is from 1 to 100 and most often from 1 to 10. The value of a in the above structures representing the repeating units depends on the molecular weight of the polymer, the higher the molecular weight the higher the value of a. Although theoretically the value of a may be the same for the ethylene repeating units and the norbornene repeating units, the value of a will be generally different for the various repeating units. In the event that a perfectly alternating coplymer is obtained, the value of a would be one, but in random copolymers the values of a for different polymer fragments may vary from as few as 1 up to 1,000 or 5,000 or more.

Illustrative examples of useful polymers are a copolymer of ethylene and triethoxysilylnorbornene, a copolymer of ethylene and the acetic acid ester of 5-norbornenemethanol, a copolymer of ethylene and the ethyl ester of norbornene carboxylic acid, a terpolymer of ethylene, triethoxysilylnorborene and norbornadiene, a terpolymer of ethylene, triethoxysilylnorbornene and norbornadiene, a terpolymer of ethylene, norbornene and the methyl ester of norbornene carboxylic acid, a terpolymer of ethylene, cyclohexenylnorbornene and the methyl ester of norbornene carboxylic acid, a tetrapolymer of ethylene, norbornene, ethylidene norbornene and norbornene carboxylic acid, a tetrapolymer of ethylene, norbornene, 5-butylnorbornene and the t-butyl ester of norbornene carboxylic acid, a tetrapolymer of ethylene, triethoxysilylnorbornene, norbornene and phenylnorbornene.

In the above exemplified polymers repeating units derived from ethylene and functional NB-type monomer may be present in an amount ranging from 1% to 99 mole % while the non-functional NB-type monomer may be from 0 to 90 mole %. Preferably the repeating units derived from ethylene can be present in a molar amount of from 10% to 90% and more preferably from 30% to 60%. The repeating units derived from the functional NB-type monomer preferably may be present in a molar amount of from 0.5% to 70% and more preferably from 1% to 20%. The repeating units derived from the non-functional NB-type monomer may be present preferably in a molar amount from 0% to 80% and more preferably from 30% to 80%. More than one monomer of each type may be present in a polymer. For example, it may be desirable to prepare a polymer containing two functional NB-type monomers such as a polymer of ethylene, norbornene, the t-butyl ester of norbornene carboxylic acid and triethoxysilylnorbornene.

The novel functional polymers have unique physical properties not possessed by other NB-type polymers. Thus such polymers have especially good adhesion to various other materials, including metals and other polymers, and thus may find applicability in electrical and electronic applications. A surface made from such copolymers also has good paintability properties.

The instant method is unique in that it makes it possible to prepare novel copolymers of ethylene and at least one functional norbornene-type monomer containing such functional groups as esters, ethers, ketones, alcohols or silyl groups. The catalysts employed in the prior art in the polymerization of cyclic olefins were deactivated if such functional groups were present.

The copolymers may be prepared from 0 to 100 per cent of functional NBtype monomers or the NB-type monomers may contain 1 to 99 per cent of non-functional and 1 to 99 per cent of functional NB-type monomers. Practical category of copolymers are those containing 1 to 10 per cent of functional NB-type monomers.

As noted above, the copolymers of the present invention are essentially amorphous and include those that are substantially alternating as well as those that are largely random. Those copolymers which contain close to 50:50 mole ratio of each category of monomers will tend to be largely alternating. These copolymers are essentially amorphous in nature and exhibit glass transition temperatures in the range of approximately 0 C. to 200 C., preferably 80° C. to 180° C. and most preferably 100° C. to 150° C. The copolymers range in molecular weight (Mw) from about 1,000 to about about 1 million, often from about 2,000 to about 800,000 and preferably from about 5,000 to about 500,000. It is possible to control the molecular weight of the resulting copolymer by the selection of the catalyst and by the concentration of the NB-type comonomer and ethylene employed. As noted above, the Tg of the copolymer may be controlled by the amount and the nature of the NB-type monomer employed in the copolymerization. Furthermore, every copolymer chain is terminated with a vinyl end group originating from β-hydride elimination from the ultimate ethylene unit.

The copolymers prepared according to the method of this invention are generally amorphous, with low crystallinity. Consequently, they are transparent. Additionally, these copolymers have relatively low density, low birefringence and low water absorption. Furthermore, they have very desirable vapor barrier properties and good resistance to hydrolysis, acids and alkali and to weathering; very good electrical insulating properties, thermoplastic processing characteristics, high stiffness, modulus, hardness and melt flow. Accordingly, these copolymers may be used for optical storage media applications such as CD and CD-ROM, in optical uses such as lenses and lighting articles, in medical applications where gamma or steam sterilization is required, as films and in electronic and electrical applications. Lower $T_g$ polymers (i.e. those containing lower amounts of NB-type monomers, such as less than 20% or even less than 10 mole %) are useful as adhesives, cross-linkers, films, impact modifiers, ionomers and the like.

Polymerizations according to this invention may be carried out in an organic solvent medium, protic medium, critical carbon dioxide or in bulk, within the use of an additional medium. The choice of solvent used in the present invention is not as critical as is often the case with Ziegler catalysts since that the catalysts of this invention are surprisingly tolerant of protic and oxygenated solvents such as water, alcohols, ethers and supercritical carbon dioxide. Thus not only can hydrocarbon and halohydrocarbon solvents be used but also protic and oxygenated diluents such as those listed above.

When organic solvents are chosen the reactions utilizing the single and multicomponent catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, o-dichlorobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, and 1-chloropentane. Other organic solvents such as alcohols (e.g. ethanol, iso-propanol and n-butanol) and ethers (e.g. di-n-butylether, di-iso-amylether) can also be used.

The choice of reaction solvent is made on the basis of a number of factors including the choice of catalyst and whether it is desired to run the polymerization as a slurry or solution process. For most of the catalysts described in this invention, the preferred solvents are aromatic hydrocarbons such as toluene or xylene, in which case a homogeneous, solution polymerization typically results. Similar results are obtained when halogenated aromatic solvents such as chlorobenzene or dichlorobenzene. Aliphatic hydrocarbons such as heptane, iso-octane and cyclohexane and chlorinated hydrocarbons such as methylene chloride and 1,2-dichloroethane typically give rise to slurry polymerizations. The solubility of the copolymers of the present invention in chlorinated aliphatic solvents such as methylene chloride increases considerably when higher levels of norbornenes bearing functional groups such as esters are incorporated. Hydrocarbon and halohydrocarbon solvents are preferred when using multi-component catalysts involving the use of alkylaluminums.

Surprisingly, the catalyst systems devoid of alkylaluminums are highly tolerant of protic impurities, functional groups, oxygenated solvents and water. Thus it is possible using these catalysts to actually run the polymerizations in supercritical carbon dioxide or even water. When running the polymerization in supercritical carbon dioxide it is preferred to use a highly fluorinated anion (such as tetrakis (pentafluorophenyl)boron) since this ensures solubility of the catalyst in the medium. When running the reactions in water it is not necessary for the catalyst to be highly soluble in the aqueous phase since effective catalysts will be distributed largely in the organic (monomer rich) phase. Aqueous polymerizations result in suspension or dispersion polymerization systems. Alternatively it is possible to run the polymerization as an emulsion system, giving rise to a latex. In this case a surfactant is preferably employed. The surfactant can be either of the ionic type (e.g. sodium lauryl sulfonate etc.) or of the non-ionic type (such as poly-ether types, e.g. Igepal®). The resulting latexes find applications in a number of areas including water-borne coatings, binders and adhesives. Preferred compositions are those including small amounts (1–10 mole %, preferably 1–5 mole %) of norbornenes bearing functional substituents such as triethoxysilyl groups, which promote adhesion to the desired substrates.

Mixtures of a protic solvent and an organic solvent may also be employed. Such solvent mixtures may contain from 1% to 99% of a protic solvent and from 99% to 1% of an organic solvent.

The aqueous polymerizations may also be carried out without the addition of any solvent or medium. For example, a liquid norbornene monomer, such as an alkyl NB, or a mixture of such monomers (serving to depress the freezing point) can also serve as the liquid monomer. Alternatively the polymerization may be carried out at a temperature exceeding the melting point of the normally solid monomer (e.g., in the case of norbornene, above 45° C.).

EXAMPLES

The catalysts used in the following examples were prepared as described below:

Bis(diphenylphosphino)ethane palladium dichloride, (1,5-cyclooctadiene)palladium dichloride and bis (triphenylphosphine) palladium dichloride were purchased from Strem Chemicals

(1,5-cyclooctadiene)palladium methyl chloride

This catalyst precursor was obtained by reacting (1,5-cyclooctadiene)palladium dichloride with a 20 mole % excess of tetramethyltin in methylene chloride at ambient temperature. The resulting orange solution was heated to reflux for about one hour, cooled and filtered through a 0.45μ microdisc filter. The solvent was removed under high vacuum and washed twice with diethyl ether before drying under vacuum to afford the desired product as a slightly off-white powder in essentially quantitative yield.
(Chelating Ligand)Palladium Methyl Chloride Catalysts The catalysts of the type (chelating ligand) palladium methyl chloride used in the following examples were prepared by reacting the (1,5-cyclooctadiene)palladium methyl chloride described above with the appropriate ligand. For example catalyst V was prepared by dissolving the (1,5-cyclooctadiene)palladium methyl chloride (0.53 g, 2 mmol) in toluene (25 mL) and adding it to a solution of ligand A (0.76 g, 2 mmol) in toluene (25 mL), the ligand having been prepared using literature methods. The resulting solution was allowed to stir overnight at ambient temperature under nitrogen. The product precipitated as an amber-orange solid in a clear amber solution. The solid was filtered under nitrogen and washed three times with pentane (until clear washings were observed) and the product dried, collected and weighed. Yield 0.88 g.

Example 1

To a clean, dry 100 mL glass reactor 5.0 g of norbornene in 50 mL of dry, deoxygenated toluene was added under nitrogen. The reactor temperature was allowed to remain at ambient temperature. To the reactor was added bis (diphenylphosphino)ethanepalladium dichloride (catalyst I) (0.015 g, 0.026 mmol) in toluene (3 mL). The reactor was then flushed with ethylene and pressurized to 10 psig with ethylene. Thereafter was added tris(pentafluorophenyl) boron (0.234 mmol) and triethylaluminum (0.260 mmol) and the ethylene pressure was immediately raised to 100 psig. The reaction was allowed to proceed for 90 minutes at which time the ethylene pressure was vented, the reactor was opened and the solution was poured into an excess of acetone to precipitate the polymer which was subsequently filtered and dried in a vacuum oven overnight. Yield 5.6 g. $M_w=7,990$ and $M_n=4,040$. The incorporation of ethylene was determined to be 58 mole percent by NMR spectroscopy. The glass transition temperature was determined to be 113° C. by DSC.

Comparative Example A

To a clean, dry 100 mL glass reactor 5.6 g of norbornene in 50 mL of dry, deoxygenated toluene was added under nitrogen. To the reactor was added bis(triphenylphosphine) palladium dichloride (0.018 g, 0.026 mmol) in toluene (3 mL). The reactor was flushed with ethylene and then pressurized with ethylene (10 psig) while the temperature was allowed to remain at ambient temperature. Thereafter was added tris(pentafluorophenyl)boron (0.234 mmol) and triethylaluminum (0.260 mmol) and the ethylene pressure was immediately raised to 100 psig. The reaction was allowed to proceed for 90 minutes at which time the ethylene pressure was vented, the reactor was opened and the resulting slurry (containing insoluble polymer) was poured into an excess of acetone and subsequently filtered and dried in a vacuum oven overnight. Yield 5.6 g. The polymer was found to be insoluble in toluene and sparingly soluble in hot ortho-dichlorobenzene. NMR spectroscopy showed the polymer to be a homopolymer of norbornene. This comparative example serves to demonstrate that monodentate ligands do not give rise to the norbornene/ethylene copolymers of the present invention.

Comparative Example B

To a clean, dry 100 mL glass reactor 5.6 g of norbornene in 50 mL of dry, deoxygenated toluene was added under nitrogen. To the reactor was added 2,2'-bipyridyl palladium dichloride (0.008 g, 0.026 mmol) in toluene (3 mL). The reactor was flushed with ethylene and then pressurized with ethylene (10 psig) while the temperature was allowed to remain at ambient temperature. Thereafter was added tris (pentafluorophenyl)boron (0.234 mmol) and triethylaluminum (0.260 mmol) and the ethylene pressure was immediately raised to 100 psig. The reaction was allowed to proceed for 90 minutes at which time the ethylene pressure was vented, the reactor was opened and the resulting slurry (containing insoluble polymer) was poured into an excess of acetone and subsequently filtered and dried in a vacuum oven overnight. Yield 3.3 g. The polymer was found to be insoluble in toluene and sparingly soluble in hot ortho-dichlorobenzene. NMR spectroscopy showed the polymer to be a homopolymer of norbornene. This comparative example serves to demonstrate that 2,2'bipyridine as ligand does not give rise to the norbornene/ethylene copolymers of the present invention.

Example 2

To a clean, dry 100 mL glass reactor 5.3 g of norbornene in 50 mL of dry, deoxygenated toluene was added under nitrogen. The reactor was flushed with ethylene and then pressurized with ethylene (10 psig) while the temperature was allowed to remain at ambient temperature. To the reactor was added a yellow solution (containing some greyish precipitate (silver chloride)) formed by premixing bis(diphenylphosphino)ethane palladium methyl chloride (catalyst II) (0.014 g, 0.026 mmol) for 5 minutes with silver hexafluoroantimonate (0.026 mmol) in toluene (3 mL). The ethylene pressure was immediately raised to 100 psig. The reaction was allowed to proceed for 90 minutes at which time the ethylene pressure was vented, the reactor was opened and the solution was poured into an excess of acetone to precipitate the polymer which was subsequently filtered and dried in a vacuum oven overnight. Yield 4.0 g. $M_w$=6,600 and $M_n$=4,080. The incorporation of ethylene was determined to be 51.6 mole percent by NMR spectroscopy.

Comparative Example C

To a clean, dry 100 mL glass reactor 5.3 g of norbornene in 50 mL of dry, deoxygenated toluene was added under nitrogen. The reactor was flushed with ethylene and then pressurized with ethylene (10 psig) while the temperature was allowed to remain at ambient temperature. To the reactor was added a dark red solution (containing some greyish precipitate (silver chloride)) formed by premixing bis(triphenylphosphine) palladium methyl chloride (0.016 g, 0.026 mmol) for 5 minutes with silver hexafluoroantimonate (0.026 mmol) in dichloroethane (4 mL). The ethylene pressure was immediately raised to 100 psig. The reaction was allowed to proceed for 90 minutes at which time the ethylene pressure was vented, the reactor was opened and the resulting slurry (containing insoluble polymer) was poured into an excess of acetone and subsequently filtered and dried in a vacuum oven overnight. Yield 0.65 g. The polymer was found to be insoluble in toluene and sparingly soluble in hot ortho-dichlorobenzene. NMR spectroscopy showed the polymer to be a homopolymer of norbornene. This comparative example serves to demonstrate that monodentate ligands do not give rise to the norbornene/ethylene copolymers of the present invention.

Comparative Example D

To a clean, dry 100 mL glass reactor 5.0 g of norbornene in 50 mL of dry, deoxygenated toluene was added under nitrogen. The reactor was flushed with ethylene and then pressurized with ethylene (10 psig) while the temperature was allowed to remain at ambient temperature. To the reactor was added the solution (containing some greyish precipitate (silver chloride)) formed by premixing bis(4,4'-dodecyl)-2,2'-bipyridyl palladium methyl chloride (0.016 g, 0.026 mmol) for 5 minutes with silver hexafluoroantimonate (0.026 mmol) in dichloroethane (4 mL). The ethylene pressure was immediately raised to 100 psig. The reaction was allowed to proceed for 90 minutes at which time the ethylene pressure was vented, the reactor was opened and the contents were poured into an excess of acetone. There was a negligeable yield of polymer. This comparative example serves to demonstrate that bipyridine ligands do not give rise to the norbornene/ethylene copolymers of the present invention.

Example 3

To a clean, dry 100 mL glass reactor 5.5 g of norbornene in 50 mL of dry, deoxygenated toluene was added under nitrogen. The reactor temperature was allowed to remain at ambient temperature. To the reactor was added bis(diphenylphosphino)ethanepalladium dichloride (catalyst I) (0.015 g, 0.026 mmol) in toluene (3 mL). The reactor was then flushed with ethylene and pressurized to 10 psig with ethylene. Thereafter was added methaluminoxane (1.0 mL of a toluene solution containing 13% w methaluminoxane) and the ethylene pressure was immediately raised to 100 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 3.8 g. $M_w$=8,900 and $M_n$=5,300. The incorporation of ethylene was determined to be 55.7 mole percent by NMR spectroscopy.

Example 4

To a clean, dry 100 mL glass reactor 5.3 g of norbornene in 50 mL of dry, deoxygenated toluene was added under nitrogen. The reactor was flushed with ethylene and then pressurized with ethylene (10 psig) while the temperature was allowed to remain at ambient temperature. To the reactor was added a solution (containing some flocculent white precipitate (sodium chloride)) formed by premixing bis(diphenylphosphino)ethane palladium methyl chloride (catalyst II) (0.014 g, 0.026 mmol) for 5 minutes with sodium tetrakis(bis-3,5-di(trifluoromethyl)phenyl)boron (0.026 mmol) in toluene (3 mL). The ethylene pressure was immediately raised to 100 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 2.1 g.

Example 5

To a clean, dry 100 mL glass reactor 2.5 g of norbornene (26.5 mmol) and 5-butylnorbornene (3.975 g, 26.5 mmol) in 50 mL of dry, deoxygenated toluene was added under nitrogen. The reactor temperature was allowed to remain at ambient temperature. To the reactor was added bis(diphenylphosphino)ethanepalladium dichloride (catalyst I) (0.015 g, 0.026 mmol) in toluene (3 mL). The reactor was then flushed with ethylene and pressurized to 10 psig with ethylene. Thereafter was added tris(pentafluorophenyl) boron (0.234 mmol) and triethylaluminum (0.260 mmol) and the ethylene pressure was immediately raised to 100 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 2.2 g. $M_w$=9,750 and $M_n$=5,700. NMR spectroscopy showed the polymer to be a terpolymer with incorporation of all three monomers.

Example 6

To a clean, dry 100 mL glass reactor 4.7 g of norbornene (50.4 mmol) and 5-triethoxysilylnorbornene (0.68 g, 2.65 mmol) in 50 mL of dry, deoxygenated toluene was added under nitrogen. The reactor temperature was allowed to remain at ambient temperature. To the reactor was added bis(diphenylphosphino)ethanepalladium dichloride (catalyst I) (0.015 g, 0.026 mmol) in toluene (3 mL). The reactor was then flushed with ethylene and pressurized to 10 psig with ethylene. Thereafter was added tris(pentafluorophenyl) boron (0.234 mmol) and triethylaluminum (0.260 mmol) and the ethylene pressure was immediately raised to 100 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 4.3 g. NMR spectroscopy showed the polymer to be a terpolymer with incorporation of all three monomers, 64.1 mol % norbornene, 30.5 mol % ethylene and 5.4 mol % triethoxysilylnorbornene.

Example 7

To a clean, dry 500 mL stainless steel reactor 20.0 g of norbornene in 150 mL of dry, deoxygenated toluene was added under nitrogen. The reactor was flushed with ethylene and then pressurized with ethylene (10 psig) while the temperature was allowed to remain at ambient temperature. To the reactor was added a solution of catalyst III (0.0446 g, 0.106 mmol) in dichloroethane (3 mL) and then silver hexafluoroantimonate (0.036 g, 0.106 mmol) in dichloroethane (3 mL). The ethylene pressure was immediately raised to 100 psig. The reaction was allowed to proceed for 2 hours at which time the ethylene pressure was vented, the reactor was opened and the solution was poured into an excess of methanol to precipitate the polymer which was subsequently filtered and dried in a vacuum oven at 80° C. overnight. Yield 14.7 g. $M_w$=191,730 and $M_n$=95,400. The incorporation of ethylene was determined to be 25 mole percent by NMR spectroscopy. The glass transition temperature was determined to be 198° C. by DSC.

Example 8

To a clean, dry 500 mL stainless steel reactor 20.0 g of norbornene in 150 mL of dry, deoxygenated toluene was added under nitrogen. The reactor was flushed with ethylene and then pressurized with ethylene (10 psig) while the temperature was allowed to remain at ambient temperature. To the reactor was added a solution of catalyst III (0.0446 g, 0.106 mmol) in dichloroethane (3 mL) and then silver hexafluoroantimonate (0.036 g, 0.106 mmol) in dichloroethane (3 mL). The ethylene pressure was immediately raised to 300 psig. The reaction was allowed to proceed for 2 hours at which time the ethylene pressure was vented, the reactor was opened and the solution was poured into an excess of methanol to precipitate the polymer which was subsequently filtered and dried in a vacuum oven at 80° C. overnight. Yield 8.5 g. $M_w$=101,200 and $M_n$=41,000. The incorporation of ethylene was determined to be 41 mole percent by NMR spectroscopy. The glass transition temperature was determined to be 139° C. by DSC.

Example 9

To a clean, dry 500 mL stainless steel reactor 20.0 g of norbornene in 150 mL of dry, deoxygenated toluene was added under nitrogen. The reactor was flushed with ethylene and then pressurized with ethylene (10 psig) while the temperature was allowed to remain at ambient temperature. To the reactor was added a solution of catalyst III (0.0446 g, 0.106 mmol) in dichloroethane (3 mL) and then sodium tetrakis(bis-3,5-di(trifluoromethyl)phenyl)boron (0.0941 g, 0.106 mmol) in dichloroethane (3 mL). The ethylene pressure was immediately raised to 100 psig. The reaction was allowed to proceed for 2 hours at which time the ethylene pressure was vented, the reactor was opened and the solution was poured into an excess of methanol to precipitate the polymer which was subsequently filtered and dried in a vacuum oven at 80° C. overnight. Yield 10.4 g. $M_w$=353,450 and $M_n$=89,600. The incorporation of ethylene was determined to be 12 mole percent by NMR spectroscopy.

Example 10

To a clean, dry 500 mL stainless steel reactor 20.0 g of norbornene in 250 mL of dry, deoxygenated toluene was added under nitrogen. The reactor was flushed with ethylene and then pressurized with ethylene (10 psig) while the temperature was allowed to remain at ambient temperature. To the reactor was added a solution of catalyst IV (0.052 g, 0.106 mmol) in dichloroethane (3 mL) and then silver hexafluoroantimonate (0.036 g, 0.106 mmol) in dichloroethane (3 mL). The ethylene pressure was immediately raised to 100 psig. The reaction was allowed to proceed for 1 hour at which time the ethylene pressure was vented, the reactor was opened and the solution was poured into an excess of methanol to precipitate the polymer which was subsequently filtered and dried in a vacuum oven at 80° C. overnight. Yield 2.9 g. The incorporation of ethylene was determined to be 40.5 mole percent by NMR spectroscopy.

Example 11

To a stainless steel autoclave with an internal volume of 300 ml was added ethyl 2-methyl-4-pentenoate (99 g, 0.7 Mole) and freshly cracked cyclopentadiene (46.4 g, 0.7 Mole). The stirred mixture was heated to 200° C. and left overnight. The reactor was then cooled and the contents removed. The resulting norbornene (NB—CH$_2$CH(CH$_3$)C (O)OC$_2$H$_5$) was purified by vacuum distillation and found to have a boiling point of about 46–7° C. at 0.02 mm Hg. The material was analyzed by GC methods and found to have a purity of 98.4 to 99.3% (different fractions). The isolated yield of high purity product was around 33 g. To a clean, dry 100 mL glass reactor 4.75 g of norbornene (50.44 mmol) and the above described ester of norbornene (NB—CH$_2$CH (CH$_3$)C(O)OC$_2$H$_5$), 0.57 mL, 2.65 mmol) in 50 mL of dry, deoxygenated toluene were added under nitrogen. The reactor temperature was allowed to remain at ambient temperature. To the reactor was added bis(diphenylphosphino) ethane-palladium dichloride (catalyst I) (0.015 g, 0.026 mmol) in toluene (3 mL). The reactor was then flushed with ethylene and pressurized to 10 psig with ethylene. Thereafter was added tris(pentafluoro-phenyl)boron (0.234 mmol) and triethylaluminum (0.260 mmol) and the ethylene pressure was immediately raised to 100 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. NMR spectroscopy showed the polymer to be a terpolymer with incorporation of all three monomers, 50.6 mol % ethylene, 47.4 mol % norbornene and 2.0 mol % of the ester of norbornene.

Example 12

To a clean, dry 500 mL stainless steel reactor 19.0 g of norbornene (201.8 mmol) and the ethyl ester of norbornene-5-carboxylic acid, 1.82 mL, 10.6 mmol) in 150 mL of dry, deoxygenated toluene were added under nitrogen. The reactor temperature was allowed to remain at ambient temperature. To the reactor was added catalyst V (0.0397 g, 0.0708 mmol) in toluene (3 mL). The reactor was then flushed with ethylene and pressurized to 10 psig with ethylene. Thereafter was added silver hexafluoroantimonate (0.0243 g, 0.0708 mmol) in dichloroethane (3 mL). The ethylene pressure was immediately raised to 100 psig. The reaction was allowed to proceed for 2 hours at which time the ethylene pressure was vented, the reactor was opened and the solution was poured into an excess of methanol to precipitate the polymer which was subsequently filtered and dried in a vacuum oven at 80° C. overnight. Yield 7.1 g. $M_w$=370,100 and $M_n$=211,500. The incorporation of ethylene was determined to be 58.2 mole percent by NMR spectroscopy, while the incorporation of norbornene was 40.8 mole percent and 1.0 mole percent of the ethyl ester. DSC studies showed the terpolymer to exhibit a Tg of 92° C.

Example 13

To a clean, dry 100 mL glass reactor 4.75 g of norbornene (50.44 mmol) and the ester of norbornene described in example 11(NB—CH$_2$CH(CH$_3$)C(O)OC$_2$H$_5$), 0.55 mL, 2.7 mmol) in 50 mL of dry, deoxygenated toluene were added under nitrogen. The reactor temperature was allowed to remain at ambient temperature. To the reactor was added catalyst V (0.0149 g) in dichloroethane (3 mL). The reactor was then flushed with ethylene and pressurized to 10 psig with ethylene. Thereafter was added silver hexafluoroantimonate (0.009 g) in dichloroethane (3 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 1.05 g. $M_w$=167,000 and $M_n$=25,000. NMR spectroscopy showed the polymer to be a terpolymer with incorporation of all three monomers, 22.0 mol % ethylene, 75.9 mol % norbornene and 2.1 mol % of the ester of norbornene. DSC studies showed the terpolymer to exhibit a Tg of 117° C.

Example 14

To a clean, dry 100 mL glass reactor 2.0 g of triethoxysilylnorbornene in 150 mL of dry, deoxygenated toluene was added under nitrogen. The reactor temperature was allowed to remain at ambient temperature. To the reactor was added catalyst V (0.0149 g) in dichloroethane (3 mL). The reactor was then flushed with ethylene and pressurized to 10 psig with ethylene. Thereafter was added silver hexafluoroantimonate (0.009 g) in dichloroethane (3 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 0.8 g. $M_w$=115,800 and $M_n$=36,200. NMR spectroscopy showed the product to be a copolymer with incorporation of ethylene and triethoxysilylnorbornene (containing approximately 4 mole percent of the triethoxysilylnorbornene).

Example 15

To a clean, dry 500 mL stainless steel reactor 20.0 g of norbornene in 150 mL of dry, deoxygenated toluene was added under nitrogen. The reactor temperature was allowed to remain at ambient temperature. To the reactor was added ligand A (0.428 g, 1.06 mmol) in toluene (3 mL) and palladium ethylhexanoate (0.106 mmol). The reactor was then flushed with ethylene and pressurized to 10 psig with ethylene. Thereafter was added tris(pentafluorophenyl) boron (0.318 mmol) and triethylaluminum (0.318 mmol) and the ethylene pressure was immediately raised to 300 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 2.5 g. $M_w$=625,600 and $M_n$=152,700. The incorporation of ethylene was determined to be 68 mole percent by NMR spectroscopy.

Example 16

To a clean, dry 500 mL stainless steel reactor 20.0 g of norbornene in 150 mL of dry, deoxygenated toluene was added under nitrogen. The reactor temperature was allowed to remain at ambient temperature. To the reactor was added ligand B (1.06 mmol) in toluene (3 mL) and palladium ethylhexanoate (0.106 mmol). The reactor was then flushed with ethylene and pressurized to 10 psig with ethylene. Thereafter was added tris(pentafluorophenyl)boron (0.318 mmol) and triethylaluminum (0.318 mmol) and the ethylene pressure was immediately raised to 300 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 5.5 g. The incorporation of ethylene was determined to be 62 mole percent by NMR spectroscopy.

Comparative Example E

This example is a repeat of examples 15 and 16 but with no ligand added. To a clean, dry 500 mL stainless steel reactor 20.0 g of norbornene in 150 mL of dry, deoxygenated toluene was added under nitrogen. The reactor temperature was allowed to remain at ambient temperature. To the reactor was added palladium ethylhexanoate (0.106 mmol). The reactor was then flushed with ethylene and pressurized to 10 psig with ethylene. Thereafter was added tris(pentafluorophenyl)-boron (0.318 mmol) and triethylaluminum (0.318 mmol) and the ethylene pressure was immediately raised to 300 psig. The reaction was allowed to proceed for 60 minutes at which time the ethylene pressure was vented, the reactor was opened and the contents (a slurry containing insoluble polymer) were poured into an excess of acetone and subsequently filtered and dried in a vacuum oven overnight. Yield 4.2 g of toluene-insoluble norbornene homopolymer. This comparative example serves to illustrate the necessity of the chelating ligands of the present invention in order to obtain the desired norbornene/ethylene copolymers.

Example 17

To a clean, dry 500 mL stainless steel reactor 20.0 g of norbornene in 150 mL of dry, deoxygenated toluene was added under nitrogen. The reactor temperature was allowed to remain at ambient temperature. To the reactor was added ligand A (0.428 g, 1.06 mmol) in toluene (3 mL) and bis(dipivaloylmethano)palladium (0.0503 g, 0.106 mmol). The reactor was then flushed with ethylene and pressurized to 10 psig with ethylene. Thereafter was added tris(pentafluorophenyl)boron (0.318 mmol) and triethylaluminum (0.318 mmol) and the ethylene pressure was immediately raised to 300 psig. The reaction was allowed to proceed for 60 minutes at which time the ethylene pressure was vented, the reactor was opened and the solution was poured into an excess of acetone to precipitate the polymer which was subsequently filtered and dried in a vacuum oven overnight. Yield 1.5 g. $M_w$=825,700 and $M_n$=242,400. The incorporation of ethylene was determined to be 65 mole percent by NMR spectroscopy.

Comparative Example F

This example is a repeat of example 17 but with no ligand added. To a clean, dry 500 mL stainless steel reactor 20.0 g of norbornene in 150 mL of dry, deoxygenated toluene was added under nitrogen. The reactor temperature was allowed to remain at ambient temperature. To the reactor was added bis(dipivaloylmethano)palladium (0.0503 g, 0.106 mmol). The reactor was then flushed with ethylene and pressurized to 10 psig with ethylene. Thereafter was added tris(pentafluorophenyl)-boron (0.318 mmol) and triethylaluminum (0.318 mmol) and the ethylene pressure was immediately raised to 300 psig. The reaction was allowed to proceed for 60 minutes at which time the ethylene pressure was vented, the reactor was opened and the contents (a slurry containing insoluble polymer) were poured into an excess of acetone and subsequently filtered and dried in a vacuum oven overnight. Yield 8.5 g of toluene-insoluble norbornene homopolymer. This comparative example serves to illustrate the necessity of the chelating ligands of the present invention in order to obtain the desired norbornene/ethylene copolymers.

Example 18

To a clean, dry 500 mL stainless steel reactor 19.0 g (200 mmol) of norbornene and the ethyl ester of norbornene carboxylic acid (1.79 g, 10.8 mmol) in 150 mL of dry, deoxygenated toluene were added under nitrogen. The reactor temperature was allowed to remain at ambient temperature. To the reactor was added catalyst III (0.0448 g, 0.106 mmol) in dichloroethane (5 mL). The reactor was then flushed with ethylene and pressurized to 10 psig with ethylene. Thereafter was added silver hexafluoroantimonate (0.036 g, 0.106 mmol) in dichloroethane (5 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 10.5 g. NMR spectroscopy showed the polymer to be rich in norbornene monomers (80 mol % norbornene, 3.2 mol % ester, 16.8 mol % ethylene). DSC studies showed the terpolymer to exhibit a Tg of 201° C.

Example 19

To a clean, dry 100 mL glass reactor 4.75 g of norbornene (50.44 mmol) and (0.45 g, 2.7 mmol) of the ester (after purification and distillation) derived by esterifying 2-norbornene-5-methanol with acetic acid ($C_7H_9$—$CH_2$—$O(CO)CH_3$) in 50 mL of dry, deoxygenated toluene were added under nitrogen. The reactor temperature was allowed to remain at ambient temperature. To the reactor was added catalyst III (0.0112 g, 0.0265 mmol) in dichloroethane (3 mL). The reactor was then flushed with ethylene and pressurized to 10 psig with ethylene. Thereafter was added silver hexafluoroantimonate (0.009 g, 0.0265 mmol) in dichloroethane (3 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 1.92 g. NMR spectroscopy showed the polymer to be rich in norbornene monomers (about 79 mol % norbornene, 1 mol % ester and 20 mol % ethylene). DSC studies showed the terpolymer to exhibit a Tg of 199° C.

Example 20

To a clean, dry 100 mL glass reactor 4.75 g of norbornene (50.44 mmol) and the methyl ester of norbornene carboxylic acid (0.43 mL, 2.7 mmol) in 50 mL of dry, deoxygenated toluene were added under nitrogen. The reactor temperature was allowed to remain at ambient temperature. To the reactor was added catalyst III (0.0112 g, 0.0265 mmol) in dichloroethane (5 mL). The reactor was then flushed with ethylene and pressurized to 10 psig with ethylene. Thereafter was added silver hexafluoroantimonate (0.009 g, 0.0265 mmol) in dichloroethane (3 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 1.48 g. NMR spectroscopy showed the polymer to be rich in norbornene monomers (about 76.5 mol % norbornene, 2.5 mol % ester and 21 mol % ethylene). DSC studies showed the terpolymer to exhibit a Tg of 213° C.

Example 21

To a clean, dry 100 mL glass reactor 5.0 g of norbornene (53.1 mmol) in 50 mL of dry, deoxygenated toluene was added under nitrogen. The reactor temperature was allowed to remain at ambient temperature. To the reactor was added catalyst VI (0.0152 g, 0.0265 mmol) in dichloroethane (3 mL). The reactor was then flushed with ethylene and pressurized to 10 psig with ethylene. Thereafter was added silver hexafluoroantimonate (0.009 g, 0.0265 mmol) in dichloroethane (3 mL) and the ethylene pressure was immediately raised to 100 psig. The reaction was allowed to proceed for 1 hour at which time the ethylene pressure was vented, the reactor was opened and the solution was poured into an excess of acetone to precipitate the polymer which was subsequently filtered and dried in a vacuum oven overnight Yield 0.4 g. NMR spectroscopy showed the polymer to be a copolymer of norbornene and ethylene (62.5 mol % norbornene, 37.5 mol % ethylene).

Example 22

To a clean, dry 100 mL glass reactor 4.75 g of norbornene (50.44 mmol) and the methyl ester of norbornene carboxylic acid (0.43 mL, 2.7 mmol) in 50 mL of dry, deoxygenated toluene were added under nitrogen. The reactor temperature was allowed to remain at ambient temperature. To the reactor was added catalyst V (0.0149 g) in dichloroethane (3 mL). The reactor was then flushed with ethylene and pressurized to 10 psig with ethylene. Thereafter was added silver hexafluoroantimonate (0.009 g) in dichloroethane (3 mL) and the ethylene pressure was immediately raised to 100 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 1.38 g. $M_w$=175,300 and $M_n$=22,000. NMR spectroscopy showed the polymer to be a terpolymer with incorporation of all three monomers, 33.8 mol % ethylene, 63.2 mol % norbornene and 3 mol % of the ester of norbornene. DSC studies showed the terpolymer to exhibit a Tg of 112° C.

Example 23

To a clean, dry 100 mL glass reactor 4.75 g of norbornene (50.44 mmol) and triethoxysilyl-norbornene (0.68 g, 2.66 mmol) in 50 mL of dry, deoxygenated dichloroethane were added under nitrogen. The reactor temperature was allowed to remain at ambient temperature. To the reactor was added catalyst III (0.0112 g, 0.0265 mmol) in dichloroethane (3 mL). The reactor was then flushed with ethylene and pressurized to 10 psig with ethylene. Thereafter was added silver hexafluoroantimonate (0.009 g) in dichloroethane (3 mL) and the ethylene pressure was immediately raised to 100 psig. The reaction was allowed to proceed for 2 hours at which time the ethylene pressure was vented, the reactor was opened and the solution was poured into an excess of methanol to precipitate the polymer which was subsequently filtered and dried in a vacuum oven overnight. Yield 0.34 g. $M_w$=90,700 and $M_n$=48,300. NMR spectroscopy showed the polymer to be a terpolymer with incorporation of all three monomers.

Example 24

To a clean, dry 500 mL stainless steel reactor 20.0 g (212 mmol) of norbornene in 150 mL of dry, deoxygenated toluene was added under nitrogen. The reactor temperature was allowed to remain at ambient temperature. To the reactor was added catalyst XII (0.0448 g, 0.106 mmol) in dichloroethane (5 mL). The reactor was then flushed with ethylene and pressurized to 10 psig with ethylene. Thereafter was added silver hexafluoroantimonate (0.036 g, 0.106 mmol) in dichloroethane (5 mL) and the ethylene pressure was immediately raised to 300 psig. The reaction was allowed to proceed for 2 hours at which time the ethylene pressure was vented, the reactor was opened and the solution was poured into an excess of acetone to precipitate the polymer which was subsequently filtered and dried in a vacuum oven overnight. Yield 4.5 g. NMR spectroscopy showed the copolymer to be rich in norbornene monomer (82 mol % norbornene 18 mol % ethylene).

Example 25

To a clean, dry 100 mL glass reactor 5.0 g of norbornene (53.1 mmol) in 50 mL of dry, deoxygenated toluene was added under nitrogen. The reactor temperature was allowed to remain at ambient temperature. To the reactor was added catalyst XII (0.0112 g, 0.0265 mmol) in dichloroethane (3 mL). The reactor was then flushed with ethylene and pressurized to 10 psig with ethylene. Thereafter was added silver hexafluoroantimonate (0.009 g, 0.0265 mmol) in dichloroethane (3 mL) and the ethylene pressure was immediately raised to 100 psig. The reaction was allowed to proceed for 1 hour at which time the ethylene pressure was vented, the reactor was opened and the solution was poured into an excess of acetone to precipitate the polymer which was subsequently filtered and dried in a vacuum oven overnight. Yield 0.56 g. NMR spectroscopy showed the polymer to be a copolymer of norbornene and ethylene, very rich in norbornene (>90 mol % norbornene, <10 mol % ethylene).

Examples 26–40

These experiments were run in toluene diluent (150 mL with 20 g norbornene or 50 mL with 1.6–10 g norbornene) at ambient temperature with a reaction time of 2 hours. The polymers were worked up as described in example 1.

| Ex. # | Cat | Co-catalyst | NB g | Et. psi | Yield g | NB/Et in copol. | Mw × 1,000 | Mn × 1,000 | Tg ° C. |
|---|---|---|---|---|---|---|---|---|---|
| 26 | III | AgSbF$_6$ | 5.0 | 100 | 2.05 | 87/13 | 178 | 97 | 216 |
| 27 | III | NaBARF | 20.0 | 100 | 10.4 | 88/12 | 353 | 90 | 215 |
| 28 | III | AgSbF$_6$ | 1.6 | 120 | 1.73 | 50/50 | 59 | 23 | 119 |
| 29 | VII | AgSbF$_6$ | 20.0 | 300 | 0.5 | 37/63 | 293.4 | 134.9 | |
| 30 | VII | AgSbF$_6$ | 5.0 | 100 | 0.1 | 51/49 | | | |
| 31 | V | AgSbF$_6$ | 20.0 | 300 | 12.6 | 38/62 | 630.6 | 71.5 | 92 |
| 32 | V | AgSbF$_6$ | 20.0 | 100 | 4.7 | 66/34 | 311.5 | 46.9 | 131 |
| 33 | V | AgSbF$_6$ | 10.0 | 80 | 1.1 | | | | |
| 34 | VIII | AgSbF$_6$ | 5.0 | 100 | 4.6 | 44/56 | 467 | 238 | 126 |
| 35 | VIII | NaBARF | 5.0 | 100 | 3.1 | 46/54 | 328 | 176 | 135 |
| 36 | VIII | AgSbF$_6$ | 20.0 | 300 | 23.0 | 38/62 | 638 | 176 | 99 |
| 37 | X | AgSbF$_6$ | 5.0 | 100 | 3.4 | 46/54 | 686 | 205 | 128 |
| 38 | X | NaBARF | 5.0 | 100 | 2.1 | 46/54 | 386 | 210 | 131 |
| 39 | X | AgSbF$_6$ | 20.0 | 300 | 23.9 | 37/63 | 452 | 200 | 97 |
| 40 | IX | AgSbF$_6$ | 20.0 | 300 | 24.1 | 50/50 | 42 | 18 | 120 |

NaBARF in the above table is the sodium salt of tetrakis{3,5-di(trifluoromethyl)phenyl}boron.

Example 41

To a clean dry 100 mL. glass reactor was added norbornene (5.0 g, 53 mmol.) and dry, deoxygenated toluene (50 mL.). The reactor temperature was allowed to remain at ambient temperature. To the reactor was added ((R)-(+)-2,2'-bis(diphenylphosphino)-1,1'-binaphthyl)palladium dichloride (20.8 mg, 0.026 mmol) in toluene (3 mL.). The reactor was then flushed with ethylene and pressurized to 10 psig with ethylene. Thereafter was added tris(pentafluorophenyl)boron (0.234 mmol) and triethylaluminum (0.260 mmol) and the ethylene pressure was immediately raised to 100 psig. The reaction was allowed to proceed for 60 minutes at which time the ethylene pressure was vented, the reactor was opened and the reactor contents were poured into an excess of acetone. The resulting polymer was filtered, washed with a large excess of acetone and then dried to constant weight in a vacuum oven (at 80° C.) overnight. Yield 1.5 g. Mw 38,000, Mn 25,000. NMR spectroscopy showed the product to be a copolymer containing approximately 54% norbornene and 46% ethylene (molar basis).

Example 42

To a clean dry 100 mL. glass reactor was added norbornene (5.0 g, 53 mmol.), deoxygenated toluene (25 mL.) and de-ionized, deoxygenated water (25 mL). The reactor temperature was allowed to remain at ambient temperature. The reactor was then flushed with ethylene and pressurized to 10 psig with ethylene. To the reactor was added a solution in toluene (5 mL) of the reaction product (after premixing at ambient temperature for 5 minutes) of bis(diphenylphosphinoethane)palladium methylchloride (catalyst II) (28 mg, 0.052 mmol) and lithium tetrakis(pentafluorophenyl)boron (45 mg, 0.052 mmol). The ethylene pressure was immediately raised to 100 psig. The reaction was allowed to proceed for 60 minutes at which time the ethylene pressure was vented, the reactor was opened and the resulting slurry was poured into an excess of methanol. The resulting polymer was filtered, washed with a large excess of methanol and then dried to constant weight in a vacuum oven (at 80° C.) overnight. Yield 2.33 g. NMR spectroscopy showed the product to be a copolymer containing approximately 56% norbornene and 44% ethylene (molar basis).

Example 43

To a clean dry 100 mL. glass reactor was added norbornene (5.0 g, 53 mmol.) dissolved in a little deoxygenated toluene (2 mL.) and de-ionized, deoxygenated water (25 mL). The reactor temperature was allowed to remain at ambient temperature. The reactor was then flushed with ethylene and pressurized to 10 psig with ethylene. To the reactor was added a solution in toluene (2.5 mL) of the reaction product (after premixing at ambient temperature for 5 minutes) of (catalyst VIII) (12 mg, 0.026 mmol) and lithium tetrakis(pentafluorophenyl)boron (22.5 mg, 0.026 mmol. The ethylene pressure was immediately raised to 100 psig. The reaction was allowed to proceed for 60 minutes at which time the ethylene pressure was vented, the reactor was opened and the resulting slurry was poured into an excess of methanol. The resulting polymer was filtered, washed with a large excess of methanol and then dried to constant weight in a vacuum oven (at 80° C.) overnight. Yield 1.8 g. NMR spectroscopy showed the product to be a copolymer containing approximately 62% norbornene and 38% ethylene (molar basis). GPC revealed to copolymer to be of high molecular weight (Mw, 493,000, Mn 125,000).

Example 44

To a clean dry 100 mL. glass reactor was added norbornene (5.0 g, 53 mmol.) dissolved in a little deoxygenated toluene (2 mL.) and de-ionized, deoxygenated water (25 mL). The reactor temperature was allowed to remain at ambient temperature. The reactor was then flushed with ethylene and pressurized to 10 psig with ethylene. To the reactor was added a solution in toluene (5 mL) of the reaction product (after premixing at ambient temperature for 5 minutes) of bis(diphenylphosphinoethane)palladium methylchloride (catalyst II) (28 mg, 0.052 mmol) and lithium tetrakis(pentafluorophenyl)boron (45 mg, 0.052 mmol). The ethylene pressure was immediately raised to 100 psig. The reaction was allowed to proceed for 60 minutes at which time the ethylene pressure was vented, the reactor was opened and the resulting slurry was poured into an excess of methanol. The resulting polymer was filtered, washed with a large excess of methanol and then dried to constant weight in a vacuum oven (at 80° C.) overnight. Yield 1.1 g. NMR spectroscopy showed the product to be a copolymer containing approximately 75% norbornene and 25% ethylene (molar basis).

What is claimed is:

1. A method of preparing a substantially amorphous copolymer from ethylene and at least one norbornene-type monomer having the structure:

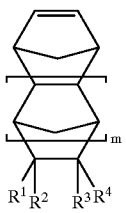

wherein each of $R^1$ to $R^4$ independently represents hydrogen, linear or branched ($C_1$ to $C_{10}$) alkyl, an aromatic or saturated or unsaturated cyclic group or a functional group —$(CH_2)_n$—C(O)OR, —$(CH_2)_n$—OR, —$(CH_2)_n$—OC(O)R, —$(CH_2)_n$—C(O)R, —$(CH_2)_n$—OC(O)OR, —$(CH_2)_n$C(R)$_2$CH(R)(C(O)OR), —$(CH_2)_n$C(R)$_2$CH(C(O)OR)$_2$, or a silyl having the structure:

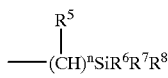

wherein in said functional groups R represents hydrogen or linear or branched ($C_1$ to $C_{10}$) alkyl; $R^5$ represents hydrogen, methyl, or ethyl; $R^6$, $R^7$, and $R^8$ independently represent halogen, linear or branched ($C_1$ to $C_{20}$) alkyl, linear or branched ($C_1$ to $C_{20}$) alkoxy, linear or branched ($C_1$ to $C_{20}$) alkyl carbonyloxy, linear or branched ($C_1$ to $C_{20}$) alkyl peroxy or substituted or unsubstituted ($C_6$ to $C_{20}$) aryloxy;

provided that at least one of $R^1$ to $R^4$ is said functional group; and further provided that $R^1$ and $R^2$ or $R^3$ and $R^4$ can be taken together to form a ($C_1$ to $C_{10}$) alkylidenyl group;

m is an integer from 0 to 5; and n is an integer from 0 to 10;

$R^1$ and $R^4$ taken together with the two ring carbon atoms to which they are attached may optionally represent a saturated cyclic group of 4 to 8 carbon atoms, and the cyclic group formed by $R^1$ and $R^4$ can be substituted by at least one of $R^2$ and $R^3$;

said method comprising polymerizing said monomers in the presence of (a) a cationic palladium catalyst represented by the formula:

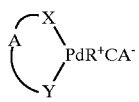

wherein

X and Y each independently is a donor heteroatom selected from the group consisting of P, N, O, S and As, and an organic group containing said heteroatoms, provided the heteroatoms are bonded to the bridging group A and not more than one of X and Y is N;

A is a divalent organic group or phosphorus forming together with X, Y and Pd a 4, 5 or 6-membered ring;

R is a hydrocarbyl group;

CA⁻ is a weakly coordinating anion; and (b) optionally an organometallic cocatalyst;

provided that the catalyst has a palladium-carbon sigma bond and if such sigma bond is absent, an organometallic cocatalyst must be employed.

2. A method of claim 1 wherein said functional substitent is selected from the group consisting of silyl and ester groups.

3. A method of claim 2 wherein the silyl group is selected from the group consisting of trialkoxysilyl, trialkylsilyl and trihalosilyl groups.

4. A method of claim 1 wherein the catalyst is prepared in situ.

5. A method of claim 1 wherein X and Y are both P; A is a divalent group forming a 5-membered ring together with X, Y and Pd; and R is a straight or branched chain alkyl group.

6. A method of claim 1 wherein X and Y are both P; A is a divalent group forming a 7-membered ring together with X, Y and Pd; and R is a straight or branched chain alkyl group.

7. A method of claim 1 wherein said polymerization is carried out in a medium selected from organic solvents, protic solvents and a mixture thereof, and supercritical carbon dioxide.

8. A method of claim 7, wherein the protic solvent is water.

9. A method of claim 1 wherein X and Y are respectively P and S; A is a divalent group forming a 5-membered ring together with X, Y and Pd; and R is a straight or branched chain alkyl group.

10. A method of claim 1 wherein X and Y are selected from the group consisting of P and N provided that both X and Y are not N; A is a divalent group forming a 5-membered ring together with X, Y and Pd; and R is a straight or branched chain alkyl group.

11. A method of claim 1 wherein said cationic palladium catalyst is obtained from (i) a palladium compound;

(ii) a neutral chelating ligand containing two heteroatoms selected from the group consisting of P, N, O, S and As, provided that the heteroatoms are bonded to the bridging group A and not more than one heteroatom is N; and (iii) a compound able to form an ionic complex when reacted with said palladium compound.

12. A method of claim 11, wherein
(i) the palladium compound is selected from the group consisting of palladium halides, aplladium enolates of β-dicarbonyl compounds, palladium carboxylates and palladium salts bearing neutral donal ligands.

13. A method of claim 12 where the neutral chelating ligand is

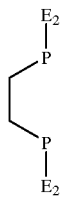

wherein E is phenyl or a substituted phenyl group.

14. A method of claim 13 where E is phenyl or a phenyl group having at least one substituent in an ortho position.

15. A method of claim 14 where the neutral chelating ligand has the structure:

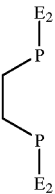

where E is phenyl group containing methyl or ethyl substituents in both ortho positions.

* * * * *